US010678709B2

(12) United States Patent
Gammel

(10) Patent No.: US 10,678,709 B2
(45) Date of Patent: Jun. 9, 2020

(54) APPARATUS AND METHOD FOR MEMORY ADDRESS ENCRYPTION

(71) Applicant: Infineon Technologies AG, Neubiberg (DE)

(72) Inventor: Berndt Gammel, Markt Schwaben (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/253,831

(22) Filed: Jan. 22, 2019

(65) Prior Publication Data

US 2019/0171583 A1 Jun. 6, 2019

Related U.S. Application Data

(60) Continuation-in-part of application No. 16/224,115, filed on Dec. 18, 2018, now abandoned, which is a division of application No. 13/942,096, filed on Jul. 15, 2013, now Pat. No. 10,176,121.

(51) Int. Cl.
*G06F 12/14* (2006.01)
*G06F 12/10* (2016.01)

(52) U.S. Cl.
CPC .......... *G06F 12/1408* (2013.01); *G06F 12/10* (2013.01); *G06F 2212/1024* (2013.01); *G06F 2212/1028* (2013.01); *Y02D 10/13* (2018.01)

(58) Field of Classification Search
CPC ................. G06F 12/1408; G06F 12/10; G06F 2212/1024; G06F 2212/1028; Y02D 10/13
See application file for complete search history.

(56) References Cited

U.S. PATENT DOCUMENTS

| | | | |
|---|---|---|---|
| 5,848,159 | A | 12/1998 | Collins et al. |
| 2004/0179681 | A1 | 9/2004 | Lee et al. |
| 2006/0101284 | A1 | 5/2006 | Feuser et al. |
| 2006/0222175 | A1 | 10/2006 | Itoh et al. |
| 2007/0185950 | A1 | 8/2007 | Yoshino et al. |
| 2008/0130870 | A1 | 6/2008 | Boscher et al. |
| 2008/0288785 | A1 | 11/2008 | Rao et al. |
| 2009/0113217 | A1 | 4/2009 | Dolgunov et al. |
| 2012/0079283 | A1 | 3/2012 | Hashimoto et al. |
| 2013/0114806 | A1 | 5/2013 | Bertoni et al. |
| 2014/0173293 | A1 | 6/2014 | Kaplan |
| 2014/0380311 | A1 | 12/2014 | Deng et al. |

FOREIGN PATENT DOCUMENTS

| | | | |
|---|---|---|---|
| CN | 1530824 | A | 9/2004 |
| CN | 1720507 | A | 1/2006 |
| CN | 101740068 | A | 6/2010 |
| CN | 103020549 | A | 4/2013 |

*Primary Examiner* — Michael Pyzocha
(74) *Attorney, Agent, or Firm* — Murphy, Bilak & Homiller, PLLC

(57) ABSTRACT

An apparatus for encrypting an input memory address to obtain an encrypted memory address comprises an input interface for receiving the input memory address being an address of a memory. Moreover, the apparatus comprises an encryption module for encrypting the input memory address depending on a cryptographic key to obtain the encrypted memory address. The encryption module is configured to encrypt the input memory address by applying a map mapping the input memory address to the encrypted memory address, wherein the encryption module is configured to apply the map by conducting a multiplication and a modulo operation using the cryptographic key and a divisor of the modulo operation, such that the map is bijective.

14 Claims, 5 Drawing Sheets

APPARATUS AND METHOD FOR MEMORY ADDRESS ENCRYPTION

TECHNICAL FIELD

The present invention relates to encryption, and, in particular, to an apparatus and method for memory address encryption.

BACKGROUND

Memory and address encryption become more and more important.

On a controller in a smartcard or similar security device the implementation of memory encryption and in particular address encryption is subject to severe and timing constraints.

It would be highly beneficial if improved concepts for memory and address encryption would be provided.

SUMMARY

According to an embodiment, an apparatus for encrypting an input memory address to obtain an encrypted memory address is provided. The apparatus comprises an input interface for receiving the input memory address being an address of a memory. Moreover, the apparatus comprises an encryption module for encrypting the input memory address depending on a cryptographic key to obtain the encrypted memory address. The encryption module is configured to encrypt the input memory address by applying a map mapping the input memory address to the encrypted memory address, wherein the encryption module is configured to apply the map by conducting a multiplication and a modulo operation using the cryptographic key and a divisor of the modulo operation, such that the map is bijective.

According to another embodiment, an apparatus for encrypting an input memory address to obtain an encrypted memory address is provided. The apparatus comprises an input interface for receiving the input memory address being an address of a memory. Moreover, the apparatus comprises a segmentation module for segmenting the input memory address into a plurality of input memory address segments. Furthermore, the apparatus comprises an encryption module for encrypting each input memory address segment of the plurality of input memory address segments depending on one of a plurality of cryptographic subkeys. The encryption module is configured to encrypt said input memory address segment by applying a map mapping said input memory address segment to an encrypted memory address segment, said encrypted memory address segment being one of a plurality of encrypted memory address segments, wherein the encryption module is configured to apply the map by conducting a multiplication and a modulo operation using one of the plurality of cryptographic subkeys and one of a plurality of divisors, such that the map is bijective. The encrypted memory address segments of the plurality of encrypted memory address segments together form the encrypted memory address.

According to a further embodiment, an apparatus comprising a memory, a CPU for processing data being stored at memory addresses in the memory, and an address encryption unit for encrypting an input memory address of the memory to obtain an encrypted memory address is provided. The address encryption unit comprises an input interface for receiving the input memory address, and an encryption module for encrypting the input memory address depending on a cryptographic key to obtain the encrypted memory address. The encryption module is configured to encrypt the input memory address by applying a map mapping the input memory address to the encrypted memory address. The encryption module is configured to apply the map by conducting a multiplication and a modulo operation using the cryptographic key and a divisor of the modulo operation, such that the map is bijective.

Moreover, The apparatus of a further embodiment is provided. The apparatus comprises a CPU for providing an original logical address, an MMU for generating a shifted logical address depending on the original logical address, an address encryption unit for encrypting the shifted logical address to obtain a physical address, the address encryption unit comprising an input interface for receiving the shifted logical address, and further comprising an encryption module for encrypting the shifted logical address depending on a cryptographic key to obtain the physical address, wherein the encryption module is configured to encrypt the shifted logical address by applying a map mapping the shifted logical address to the physical address, wherein the encryption module is configured to apply the map by conducting a multiplication and a modulo operation using the cryptographic key and a divisor of the modulo operation, such that the map is bijective, a data encryption-decryption unit for encrypting first plaintext data to obtain first ciphertext data and for decrypting second ciphertext data to obtain second plaintext data, a key storage for storing the cryptographic key, and a memory being configured to either store the first ciphertext data at the physical address, or to provide the second ciphertext data being stored at the physical address to the data encryption-decryption module.

According to another embodiment, a method for encrypting an input memory address to obtain an encrypted memory address is provided. The method comprises:

- Receiving the input memory address being an address of a memory, and:
- Encrypting the input memory address depending on a cryptographic key to obtain the encrypted memory address.

Encrypting the input memory address comprises applying a map mapping the input memory address to the encrypted memory address by conducting a multiplication and a modulo operation using the cryptographic key and a divisor of the modulo operation, such that the map is bijective.

According to a further embodiment, a method for encrypting an input memory address to obtain an encrypted memory address is provided. The method comprises:

- Receiving the input memory address being an address of a memory.
- Segmenting the input memory address into a plurality of input memory address segments, and
- Encrypting each input memory address segment of the plurality of input memory address segments depending on one of a plurality of cryptographic subkeys to obtain the encrypted memory address, wherein encrypting said input memory address segment comprises applying a map mapping said input memory address segment to an encrypted memory address segment of a plurality of encrypted memory address segments by conducting multiplication and a modulo operation using one of the plurality of cryptographic subkeys and one of a plurality of divisors, such that the map is bijective.

The encrypted memory address segments of the plurality of encrypted memory address segments together form the encrypted memory address.

Before embodiments of the present invention are described in detail using the accompanying figures, it is to be pointed out that the same or functionally equal elements are given the same reference numbers in the figures and that a repeated description for elements provided with the sane reference numbers is omitted. Hence, descriptions provided for elements having the same reference numbers are mutually exchangeable.

DETAILED DESCRIPTION

Before describing preferred embodiments in detail, some reasoning on address encryption is provided which helps to provide a better understanding of the preferred embodiments.

Address encryption may be realized as a bijective map f, e.g. a permutation from plain addresses a to encrypted addresses a'. The mapping is controlled by a key k:

$$a'=f_k(a).$$

For test purposes, such as production tests, it may be important to have a keyed function $a'=f_k(a)$, for which there is an identity-key, called $k_0$, with the property that it yields the identity map, i.e. $a=f_{k0}(a)$. This means scrambling is switched off.

The implementation of such a function may be critical in microcontroller architecture, because of several reasons. For example, any delay in the address path from the controller to the memory (see figure: path from MMU to memory) leads to deterioration of the system performance. If the implementation needs a large number of gate delays, additional clock cycles for the memory access are needed. Moreover, complex designs lead to high power consumption, because memory addressing is highly frequent.

It may often be sufficient that the address encryption is not cryptographically hard, but that sufficient scrambling is provided to make subsequent attacks harder. For example, address scrambling makes the identification of data blocks, necessary for a cryptanalysis of the memory encryption of data, much more difficult. Secondly, address scrambling renders the identification of memory blocks for subsequent fault injection attacks much more difficult.

Figure 5:
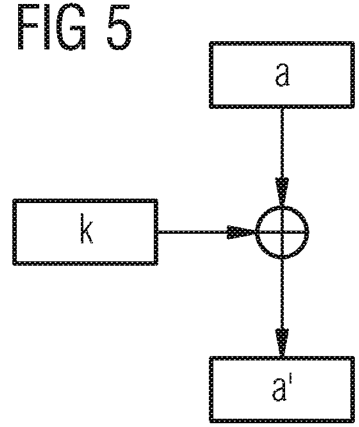
FIG. 5 illustrates an approach for address encryption.

Address encryption may be realized by a first approach as illustrated by FIG. 5, where an exclusive-OR of the addresses with a key is conducted:

$$f_k(a)=a\oplus k.$$

Advantages of this approach are a minimal gate count, a minimum performance impact, because of minimal circuit depth (only 1 gate delay is added), and an existence of an identity key: For k=0 scrambling is disabled. However, such an approach realizes only a linear map, e.g. such an approach has no cryptographic strength at all. The approach works on a bit-by-bit basis, and i.e. there is no mixing of bits. Hence, it can be re-engineered and broken easily. This results in low-end security.

Modifying the approach of FIG. 5, a related simple scrambling may be implemented.

Figure 6:
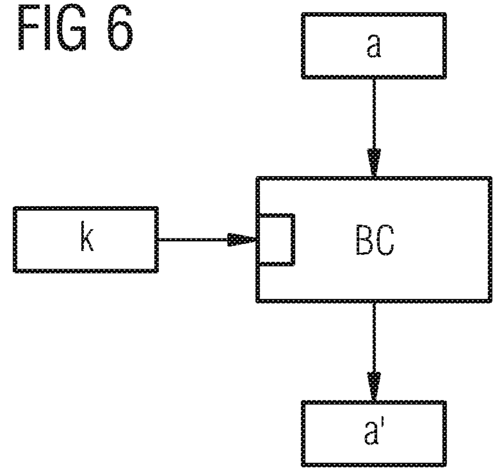
FIG. 6 illustrates another approach for address encryption.

Alternatively, address encryption may be realized by a second approach, as illustrated by FIG. 6, where a block cipher BC is used for encryption:

$$f_k(a)=\mathrm{BC}(\mathrm{key}=k,a).$$

An advantage of such an approach is high cryptographic strength, if a strong cipher is used. Disadvantages are a high gate count, a drastic performance degradation, because block ciphers are round based, and cryptographically hard block ciphers need a high round number, e.g. 16 for DES or 10 for AES-128. Hence, the critical access time to memory is increased by a huge factor, as several additional clock cycles are needed in the address phase, and there is usually no (known) identity-key. The identity map must be realized by an additional bypass using multiplexors.

The approach illustrated by FIG. 6 may be implemented with a strongly reduced round number, e.g. only 1 or 2 rounds. In this case the cryptographic strength is almost completely lost. Hence, the investment of high hardware costs does not pay off at all.

Figure 7:
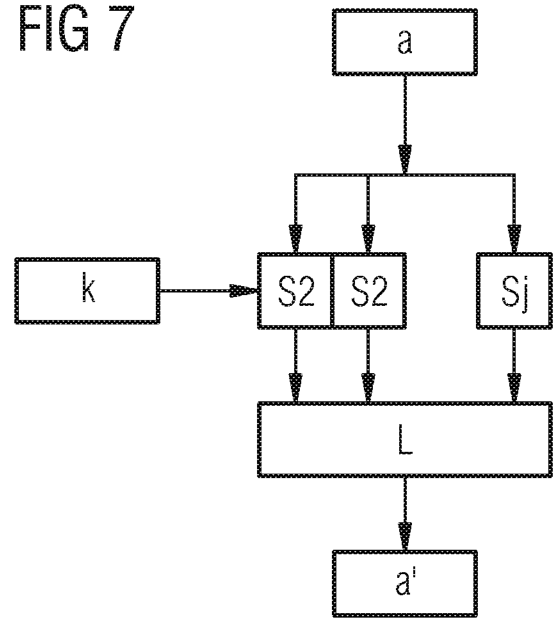
FIG. 7 illustrates a further approach for address encryption.

Alternatively, address encryption may be realized by a third approach, as illustrated by FIG. 7, where a set of substitution boxes (S-boxes) is used. Assuming $$S(a)=(S_1(a_1),S_2(a_2), \ldots S_n(a_j))$$

is a set of j m-to-m S-boxes, each of which maps a disjoint subrange of the address space. Then, assuming $$f_k(a)=S(a)\oplus k$$

or $$f_k(a)=L(S(a),k)$$

with L some linear operation.

This corresponds basically to one round of a classical block cipher (see b) with one S-box layer, a key addition step, and optionally some linear diffusion layer.

An advantage of this approach is that it can be constructed such that an identity key exists. However, disadvantages are that even small S-boxes like 4×4 S-boxes already have a high gate count and a high circuit depth. They contribute usually with a significant number of gate delays which deteriorates the performance of the memory access. As a consequence, an extra clock cycle may be needed in the address phase. Moreover, such an approach has only medium cryptographic strength. The approach illustrated by FIG. 7 lacks cryptographic strength, and a deterioration of the memory access time similar to the second approach according to FIG. 6 results.

Preferred embodiments avoid the disadvantages of the approaches illustrated by FIGS. 5, 6 and 7.

Figure 1:
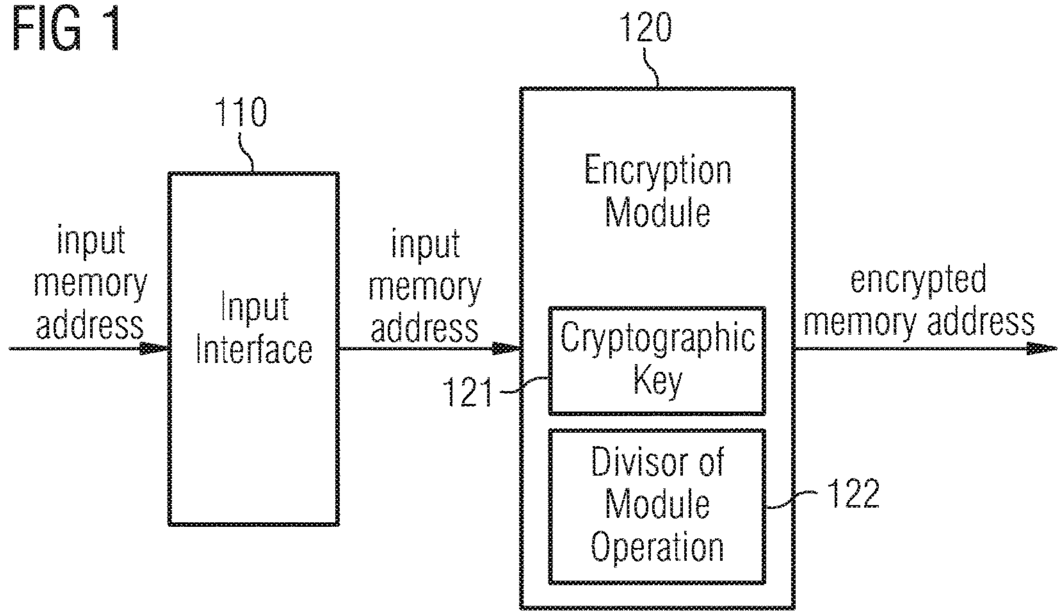
FIG. 1 illustrates an apparatus for encrypting an input memory address to obtain an encrypted memory address according to an embodiment.

FIG. 1 illustrates are apparatus for encrypting an input memory address to obtain an encrypted memory address according to an embodiment.

The apparatus comprises an input interface 110 for receiving the input memory address being an address of a memory.

Moreover, the apparatus comprises an encryption module 120 for encrypting the input memory address depending on a cryptographic key 121 to obtain the encrypted memory address.

The encryption module 120 is configured to encrypt the input memory address by applying a map mapping the input memory address to the encrypted memory address.

The encryption module 120 is configured to apply the map by conducting a multiplication and a modulo operation using the cryptographic key 121 and a divisor 122 of the modulo operation, such that the map is bijective.

According to an embodiment, the input memory address, the encrypted memory address, the cryptographic key 121 and the divisor 122 of the modulo operation may each indicate a polynomial. In such an embodiment, the divisor 122 may indicate a polynomial which is an irreducible polynomial.

In some embodiments, the divisor 122 may indicate a polynomial, which is an irreducible polynomial, where all coefficients of the irreducible polynomial are rational. Regarding polynomials where all are rational, a polynomial may, for example, be considered as being irreducible, if it cannot be expressed as the product of two or more polynomials where all coefficients are rational, such that each of said two or more polynomials where all coefficients are rational has a lower degree than the original polynomial.

However, in some embodiments, the divisor 122 may indicate a polynomial which is an irreducible polynomial, and wherein one, some or all coefficients of the irreducible polynomial are not rational.

Figure 2:
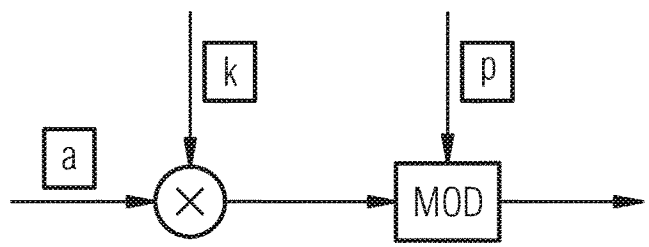
FIG. 2 illustrates an encryption module 120 according to an embodiment.

FIG. 2 illustrates an encryption module 120 according to a particular embodiment, where the encryption module 120 is configured to apply the map by employing the formula:

$$a'=ak(\text{mod } p)$$

In such an embodiment, a indicates the input memory address, a' indicates the encrypted memory address, k indicates the encryption key, and p indicates the divisor.

E.g., as a simplified example, consider that:

$$a=1001;\ k=1101;\ p=101$$

Then, the hits of the hit-sequence may represent coefficients of a polynomial over the Galois field GF(2):

$$\text{polynomial }(a)=1\sim x^3+0\cdot x^2+0\cdot x^1+1\cdot x^0=x^3+1$$

$$\text{polynomial}(k)=1\cdot x^3+1\cdot x^2+0\cdot x^1+1\cdot x^0=x^3+x^2+1$$

$$\text{polynomial}(p)=1\cdot x^2+0\cdot x^1+1\cdot x^0=x^2+1$$

Here, $x^2+1$ is an irreducible polynomial over GF(2).

In contrast, a polynomial $x^2$ is a reducible polynomial, as $x^2=x\cdot x$.

For example, some embodiments may apply the general rule that a hit sequence:

$$b_{n-1}b_{n-2}b_{n-3}\ldots b_2b_1b_0$$

indicates the polynomial:

$$b_{n-1}x^{n-1}+b_{n-2}x^{n-2}+b_{n-3}x^{-3}+\ldots+b_2x^2+b_1x+b_0.$$

Moreover, it should be noted that according to embodiments, for example, $$a\ k\ (\text{mod } p)$$

means $$(a\ k)\ \text{mid } p;$$

(e.g. at first: multiplication of a and k; then modulo division of the result by p).

According to a particular embodiment, the address a and the key k are considered as elements of a polynomial ring, e.g. the extension field $F_q[x]/(p)$, with p being some irreducible polynominal.

In a particular embodiment, the characteristic q=2 is chosen, so that address bit ranges can be assigned to field elements.

Then the address encryption can be written as a modular multiplication:

$$a'=ak(\text{mod } p)$$

According to other embodiments, an auxiliary key h is employed such that:

$$a'=ak(\text{mod } p)+b$$

Here "+" denotes the addition in the field, e.g., exclusive-Or (⊕) for q=2.

For a fixed, e.g. preselected, value of k≠0 and p being irreducible, the map is bijective and generates a permutation of the set of original address values. Because of this property, the polynomial ring operation can be used as an address encryption.

Compared with prior art, embodiments for efficient address scrambling as provided here are particularly advantageous.

For example, generally, the field multiplication can be implemented such that it is performed with only a few gate delays. That means it can be done one-the-fly within the address clock cycle (no additional clock cycle needed). For sparse polynomials p the gate delay of the circuit is very small.

Moreover, area and power consumption are smaller compared to prior art solutions.

Furthermore, security is improved compared to the "X or" prior art approach described above and comparable to "S-Box layer" prior art approach described above, but at significantly reduced area and power costs. A well-chosen polynomial will generate a highly nonlinear mixing of the address bits.

Moreover, according to embodiments, a natural identity-key k=1 might exist, which is useful for production test purposes. So, according to some embodiments, the apparatus is configurable to select an identity key as the encryption key k, such that $$ak(\text{mod } p)=a \text{ mod } p.$$

Furthermore, according to embodiments, a zero key, which yields a'=0. This can be used as a security countermeasure: If an attack is detected the key can be cleared to all−0. In this case all access will be mapped to address 0 (or a fixed address b, if the affine variant is employed). It is advantageous that this address contains only dummy data, such the attacker will only read dummy data from then on. Thus, according to some embodiments, the apparatus is configurable to select a zero key as the encryption key k, such that $$ak(\text{mod } p)=0.$$

According to some embodiments which the encryption module 120 is configured to apply the map by employing the formula $$a'=ak(\text{mod } p)+b,$$

wherein a indicates the input memory address, wherein a' indicates the encrypted memory address, wherein k indicates the encryption key, wherein p indicates the divisor, and wherein b indicates an auxiliary key.

In some embodiments, the apparatus is configurable to select an identity key as the encryption key k, such that $$ak(\text{mod } p)+b=a \text{ mod } p+b.$$

According to some embodiments, the apparatus is configurable to select a zero key as the encryption key k, such that a k (mod p)+b=b.

Some embodiments provide versions of the above-described concepts with segmented address ranges. The presented address scrambling method can also be applied to segmented address spaces. An address granularity may be introduced by the controller's memory hierarchy. For example, a non-volatile memory contains a number of $N_s$ segments (which can be erased at a time), each of which contains a number of $N_b$ blocks (which are programmed at a time), each of which contains a number of $N_w$ words (determined by the processor word width), each of which contains a number of $N_b$ bytes. When applying scrambling, it is in practice only possible to exchange a data unit with another data unit within the same parent unit. For example, only blocks in the same segment may be exchanged, only words in the same block may be exchanged, and so forth.

Figure 3:
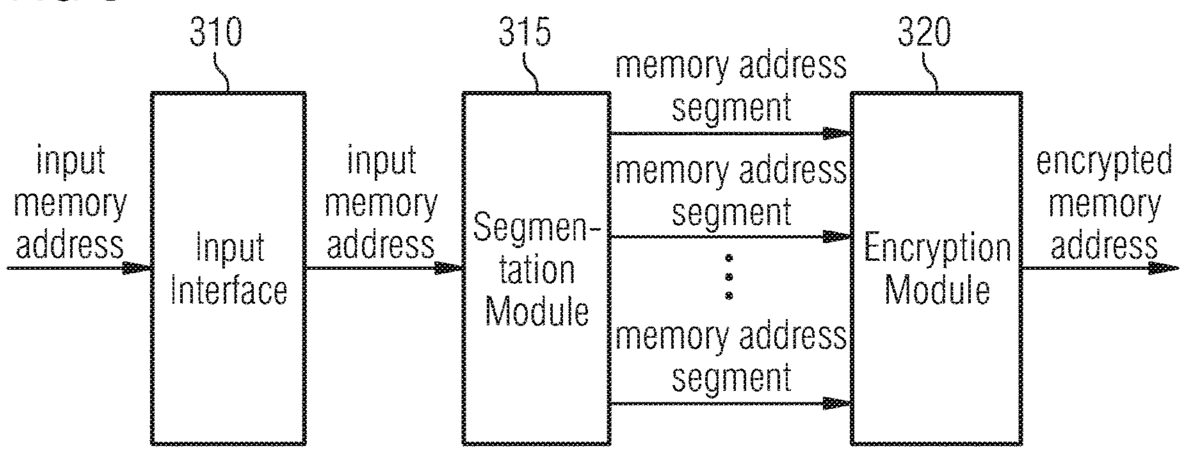
FIG. 3 illustrates an apparatus for encrypting an input memory address to obtain an encrypted memory address according to an embodiment.

Accordingly, FIG. 3 illustrates an apparatus for encrypting an input memory address to obtain an encrypted memory address according to another embodiment.

The apparatus comprises an input interface 310 for receiving the input memory address being an address of a memory.

Moreover, the apparatus comprises a segmentation module 315 for segmenting the input memory address into a plurality of input memory address segments.

Furthermore, the apparatus comprises an encryption module 320 for encrypting each input memory address segment of the plurality of input memory address segments depending on a respective one of a plurality of cryptographic subkeys. The encryption module 320 is configured to encrypt said input memory address segment by applying a map mapping said input memory address segment to an encrypted memory address segment, said encrypted memory address segment being one of a plurality of encrypted memory address segments. The encryption module 320 is configured to apply the map by conducting a multiplication and a modulo operation using one of the plurality of cryptographic subkeys and one of a plurality of divisors, such that the map is bijective.

The encrypted memory address segments of the plurality of encrypted memory address segments together form the encrypted memory address.

In an embodiment, each of the plurality of input memory address segments indicates a polynomial of a first group of polynomials, wherein each of the plurality of encrypted memory address segments indicates a polynomial of a second group of polynomials, wherein each of the plurality of cryptographic subkeys indicates a third polynomial, and wherein each of the pier f divisors indicates a fourth polynomial being an irreducible polynomial.

According to an embodiment, the encryption module 320 is configured to encrypt each of the input memory address segments by applying said map mapping said input memory address segment to one of the plurality of encrypted memory address segments, by employing the formula $$a_i'=a_ik_i(\text{mod } p_i),$$

wherein i indicates an index of said input memory address segment, wherein $a_i$ indicates said input memory address segment, wherein $a_i'$ indicates one of the plurality of encrypted memory address segments, wherein $k_i$ indicates one of the encryption subkeys, and wherein $p_i$ indicates one of the divisors.

In a particular embodiment the (input) address is split into segments $a=(a_1, a_2, \ldots, a_n)$, for example, according to the memory hierarchy of the system, subkeys $k_1, k_2, \ldots, k_a$ are derived from a key k. For example, a subkey derivation could be a segmentation of the key into bit ranges $k=(k_1, k_2, \ldots, k_n)$. Different reduction polynomials $p_1, p_2, \ldots, p_n$ may be used. Then the map of the scrambling operation of the total memory system may, for example, be achieved by $$a_1' = a_1k_1(\text{mod } p_1)$$

$$a_2' = a_2k_2(\text{mod } p_2)$$

$$\ldots$$

$$a_n' = a_nk_n(\text{mod } p_n).$$

As the operations on all hierarchy levels can be done in parallel, there is no additional penalty for the performance.

According to an embodiment, the apparatus is configurable to select for each input memory address segment $a_i$ of the input memory address segments an identity key as the encryption key $k_i$, such that $a_i$ $k_i$ (mod $p_i$)=$a_i$ (mod $p_i$).

In an embodiment, the apparatus is configurable to select for each input memory address segment $a_i$ of the input memory address segments a zero key as the encryption key $k_i$, such that $a_i$ $k_i$ (mod $p_i$)=0.

According to an embodiment, the encryption module 320 is configured to encrypt each of the input memory address segments by applying said map mapping said input memory address segment one of the plurality, of encrypted memory address segments, by employing the formula $$a_i'=a_ik_i(\text{mod } p_i)+b_i.$$

wherein i indicates an index of said input memory address segment, wherein $a_i$ indicates said input memory address segment, wherein $a_i'$ indicates said one of the plurality of encrypted memory address segments, wherein $k_i$ indicates one of the encryption subkeys, wherein $p_i$ indicates one of the divisors, and wherein $b_i$ indicates one of a plurality of auxiliary keys.

In an embodiment, the apparatus is configurable to select for each input memory address segment $a_i$ of the input memory address segments an identity key as the encryption k $k_i$, such that $$a_ik_i(\text{mod } p_i)+b_i=a_i \ (\text{mod } p_i)+b_i.$$

According to an embodiment, the apparatus is configurable to select for each input memory address segment $a_i$ of the input memory address segments a zero key as the encryption key $k_i$, such that $$a_ik_i(\text{mod } p_i)+b_i=b_i.$$

In particular embodiments, further diversification or scrambling of the encrypted memory address segments is provided by using, for the mapping of an input memory address segment $a_i$ to an encrypted memory address segment $a_i'$, one or more bits from of the input memory address other than bits of the input memory address being mapped. In other words, all or part of one or more other input memory address segments may be incorporated into the mapping. Thus, for example, the encryption module may be configured to conduct, for each of one or more of the input memory address segments, a multiplication and modulo operation as described above, but using one or more bits of the input memory address other than bits of the input memory address segment being mapped. This may be done in any of several different ways. For example, one or more bits of the input memory address may be incorporated into or used to modify or select the cryptographic subkey $k_i$, in some embodiments, or incorporated into or used to modify or select an auxiliary key $b_i$, in others, or some combination of both, in still others. In any of these or in embodiments, one or more of the input memory address bits may be incorporated into or used to modify or select the divisor $p_i$.

It will be appreciated that these approaches, in which input memory address bits from portions of the input memory address other the input memory address segment being encrypted are incorporated into the mapping, will diversify the output from the mapping, so that the same input memory address segment will map to different encrypted memory address segments, depending on those other bits. This will make it more difficult for an attacker to identify blocks of encrypted memory addresses that belong together, since, for example, an input memory address segment that contains high-order bits of the input memory address, which will change only occasionally as the range of memory addresses is scanned in order, will map to very different encrypted memory address segments, in dependence on the lower-order bits of the input memory address.

Figure 4:
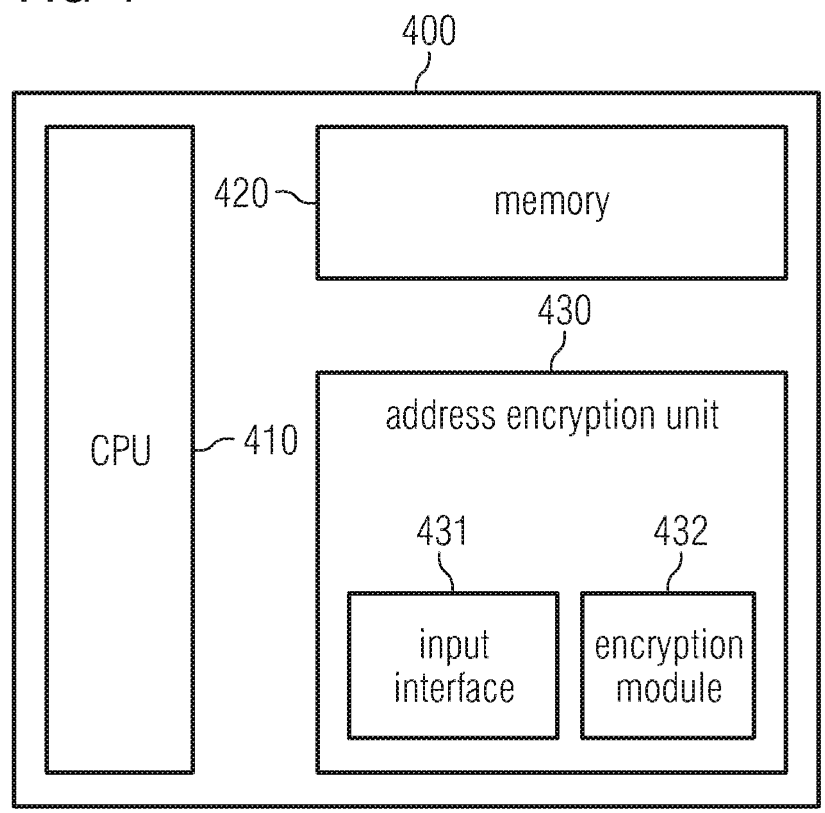
FIG. 4 illustrates an apparatus comprising a memory 410, a CPU 420 and an address encryption unit 430 according to an embodiment.

FIG. 4 illustrates an apparatus 400 comprising a memory 410, a CPU 420 for processing data being stored at memory addresses in the memory, and an address encryption unit 430 for encrypting an input memory address of the memory to obtain an encrypted memory address according to an embodiment.

The address encryption unit 430 comprises an input interface 431 for receiving the input memory address, and an encryption module 432 for encrypting the input memory address depending on a cryptographic key to obtain the encrypted memory address.

The encryption module 432 is configured to encrypt the input memory address by applying a map mapping the input memory address to the encrypted memory address. Moreover, the encryption module 432 is configured to apply the map by conducting a multiplication and a modulo operation using the cryptographic key and a divisor of the modulo operation, such that the map is bijective.

In some embodiments, the address encryption unit 430 may be an apparatus for encrypting an input memory address to obtain an encrypted memory address according to one of the above-described embodiments.

Figure 8:
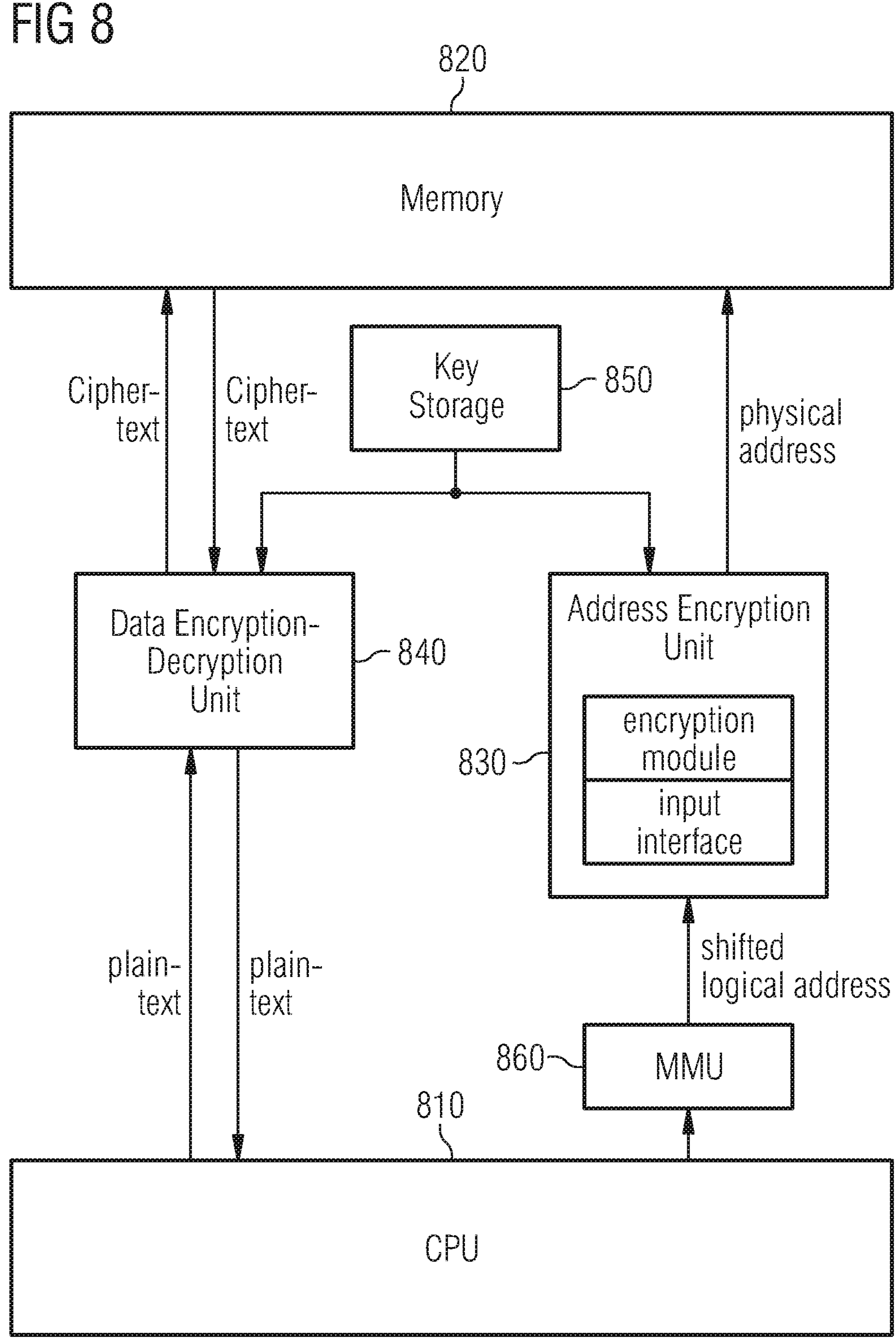
FIG. 8 illustrates The apparatus of a further embodiment, comprising a CPU, an MMU, an address encryption unit, a data encryption-decryption unit, a key storage and a memory.

FIG. 8 illustrates an architecture where address encryption, e.g. address encryption according to one of the above-described embodiments, may be employed.

FIG. 8 illustrates a CPU 810, a memory 820, an address encryption unit 830, a data encryption-decryption unit 840, a key storage 850, and an MMU (memory management unit) 860.

The CPU needs to store data in the memory 820. Moreover, the CPU 810 needs to load data from the memory 820.

To transfer data from the CPU 810 to the memory 820 and from the memory 820 to the 810, data buses are employed.

The CPU 810 uses plaintext data. However, data shall be stored in the memory 820 as ciphertext (encrypted data). Therefore, when the CPU 810 wants to store (plaintext) data in the mentor), 820, the CPU 810 sends the plaintext data to the data encryption-decryption unit 840 via a data bus. The data encryption-decryption unit 840 encrypts the plaintext data to obtain ciphertext data and stores the ciphertext data in the memory 820. When the CPU 810 wants to load data from the memory 820, the encrypted data is loaded from the memory 820 and fed into the data encryption-decryption unit 840 The data encryption unit 840 decrypts the ciphertext data to obtain plaintext data and transmits the plaintext data to the CPU 810.

For encrypting plaintext data and for decrypting ciphertext data, the data encryption-decryption unit 840 may use a (cryptographic) key stored in a particular memory area, the key storage 850.

The CPU 810 may know a logical address of data being stored in the memory 820.

For storing data at an original logical address, the CPU 810 passes the original logical address to the MMU 860. The MMU 860 may shift the original logical address to obtain a shifted logical address and passes the shifted logical address to the address encryption module 830. The address encryption module 830 encrypts, by employing address encryption, the shifted address into a physical address. The physical address is passed to the memory 820 via an address bus, so that the memory 820 is aware where the data is to be stored.

The address encryption unit 830 may an apparatus for encrypting an input memory address according to one of the above-described embodiments.

For loading data from an original logical address, the CPU 810 again passes the original logical address to the MMU 860. The MMU 860 may shift the original logical address to obtain a shifted logical address and passes the shifted logical address to the address encryption module 830. The address encryption module 830 encrypts, by employing address encryption, the shifted logical address into a physical address. The physical address is passed to the memory 820 via an address bus, so that the memory 820 is aware where the data, which shall be loaded, is located.

For address encryption, the address encryption unit 830 may use a (cryptographic) key stored in a particular memory area, the key storage 850.

In particular, FIG. 8 illustrates an embodiment of an apparatus, comprising:

- a CPU 810 for providing an original logical address,
- an MMU 860 for generating a shifted logical address depending on the original logical address.
- an address encryption unit 830 for encrypting the shifted logical address to obtain a physical address, the address encryption unit 830 comprising an input interface for receiving the shifted logical address, and further comprising an encryption module for encrypting the shifted logical address depending on a cryptographic key to obtain the physical address, wherein the encryption module is configured to encrypt the shifted logical address by applying a map mapping the shifted logical address to the physical address, wherein the encryption module is configured to apply the map by conducting a multiplication and a module operation using the cryptographic key and a divisor of the modulo operation, such that the map is bijective,
- a data encryption-decryption unit 840 for encrypting first plaintext data to obtain first ciphertext data and for decrypting second ciphertext data to obtain second plaintext data, a key storage 850 for storing the cryptographic key, and a memory 820 being configured to either store the first ciphertext data at the physical address, or to provide the second ciphertext data being stored at the physical address to the data encryption-decryption module.

Figure 9:
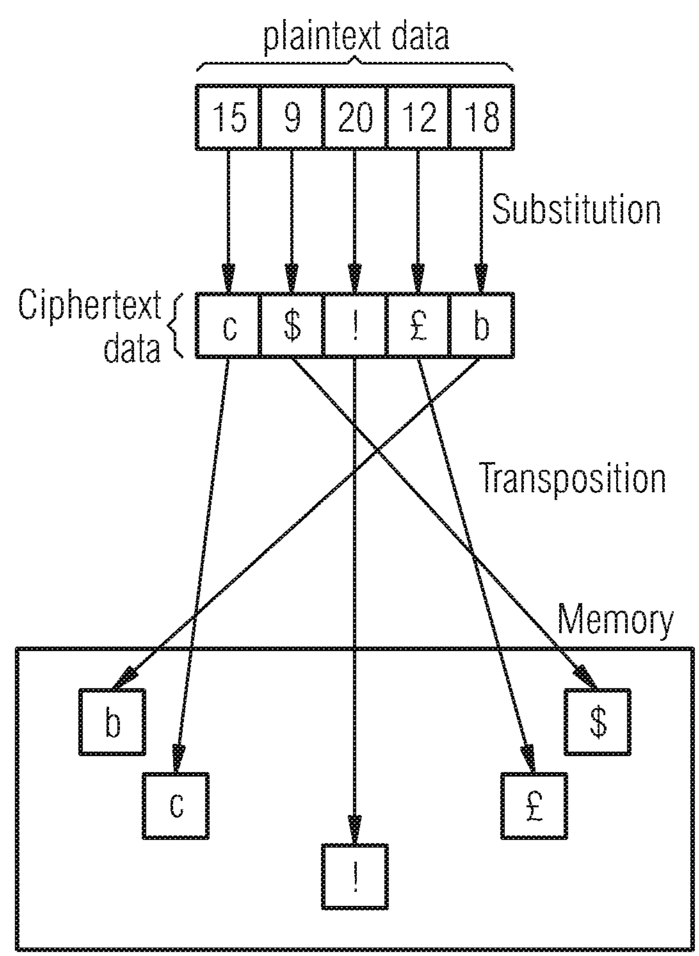
FIG. 9 illustrates the effect of combined data encryption and address encryption.

Thus, a double protection is achieved, as can be seen in FIG. 9: By encrypting the data, the plaintext data is substituted by ciphertext data, so that an attacker cannot read the plaintext data. By encrypting the original address to obtain an encrypted address, a transposition of the address is realized, and the data is not stored at the memory location indicated by the original address but is instead stored at the encrypted address. Thus, an attacker is not aware, where the data is stored, and moreover, data at subsequent logical addresses is stored at completely different physical locations in the memory, as address encryption is employed.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding unit or item or feature of a corresponding apparatus.

The inventive decomposed signal can be stored on a digital storage medium be transmitted on a transmission medium such as a wireless transmission medium or a wired transmission medium such as the Internet.

Depending on certain implementation requirements, embodiments of embodiments can be implemented in hardware or in software. The implementation can be performed using digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to embodiments comprise a non-transitory data carrier having electronically readable control signals, which are capable of cooperating with a programmable computer system, such that me of the methods described herein is performed.

Generally, embodiments of the present invention can be implemented as a computer program product with a program code, the program code being operative for performing one of the methods when the computer program product runs on a computer. The program code may for example be stored an a machine-readable carrier.

Other embodiments comprise, the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Although each claim only refers back to one single claim, the disclosure also covers any conceivable combination of claims.

What is claimed is:

1. An apparatus for encrypting an input memory address to obtain an encrypted memory address, comprising:

an input interface configured to receive the input memory address being an address of a memory, a segmentation module configured to segment the input memory address into a plurality of input memory address segments, and an encryption module configured to encrypt each input memory address segment of the plurality of input memory address segments depending on a respective one of a plurality of cryptographic subkeys, wherein the encryption module is configured to encrypt said input memory address segment by applying a map mapping said input memory address segment to an encrypted memory address segment, said encrypted memory address segment being one of a plurality of encrypted memory address segments, wherein the encryption module is configured to apply the map by conducting a multiplication and a modulo operation using one of the plurality of cryptographic subkeys and one of a plurality of divisors, such that the map is bijective, wherein the encrypted memory address segments of the plurality of encrypted memory address segments together form the encrypted memory address.

2. The apparatus of claim 1, wherein each of the plurality of input memory address segments indicates a polynomial of a first group of polynomials, wherein each of the plurality of encrypted memory address segments indicates a polynomial of a second group of polynomials, wherein each of the plurality of cryptographic subkeys indicates a third polynomial, and wherein each of the plurality of divisors indicates a fourth polynomial being an irreducible polynomial.

3. The apparatus of claim 1, wherein the encryption module is configured to encrypt each of the input memory address segments by applying said map mapping said input memory address segment to one of the plurality of encrypted memory address segments, by employing the formula $$a_i' = a_i\, k_i \pmod{p_i},$$

wherein i indicates an index of said input memory address segment, wherein $a_i$ indicates said input memory address segment, wherein $a_i'$ indicates said one of the plurality of encrypted memory address segments, wherein $k_i$ indicates one of the encryption subkeys, and wherein $p_i$ indicates one of the divisors.

4. The apparatus of claim 3, wherein the apparatus is configurable to select for each input memory address segment $a_i$ of the input memory address segments an identity key as the encryption key $k_i$, such that $a_i\, k_i \pmod{p_i} = a_i \pmod{p_i}$.

5. The apparatus of claim 3, wherein the apparatus is configurable to select for each input memory address segment $a_i$ of the input memory address segments a zero key as the encryption key $k_i$, such that $a_i\, k_i \pmod{p_i} = 0$.

6. The apparatus of claim 1, wherein the encryption module is configured to encrypt each of the input memory address segments by applying said map mapping said input memory address segment to one of the plurality of encrypted memory address segments, by employing the formula $$a_i' = a_i\, k_i \pmod{p_i} + b_i,$$

wherein i indicates an index of said input memory address segment, wherein $a_i$ indicates said input memory address segment, wherein $a_i'$ indicates said one of the plurality of encrypted memory address segments, wherein $k_i$ indicates one of the encryption subkeys, wherein $p_i$ indicates one of the divisors, and wherein $b_i$ indicates one of a plurality of auxiliary keys.

7. The apparatus of claim 6, wherein the apparatus is configurable to select for each input memory address segment $a_i$ of the input memory address segments an identity key as the encryption key $k_i$, such that $$a_i\, k_i \pmod{p_i} + b_i = a_i \pmod{p_i} + b_i.$$

8. The apparatus of claim 6, wherein the apparatus is configurable to select for each input memory address segment $a_i$ of the input memory address segments a zero key as the encryption key $k_i$, such that $$a_i\, k_i \pmod{p_i} + b_i = b_i.$$

9. The apparatus of claim 1, wherein the encryption module is configured to conduct the multiplication and the modulo operation further using one or more bits of the input memory address other than bits of the input memory address segment being mapped.

10. An apparatus comprising:

a microprocessor for providing an original logical address, a memory management unit (MMU) for generating a shifted logical address depending on the original logical address, an address encryption unit for encrypting the shifted logical address to obtain a physical address, the address encryption unit comprising an input interface for receiving the shifted logical address, and further comprising an encryption module for encrypting the shifted logical address depending on a cryptographic key to obtain the physical address, wherein the encryption module is configured to encrypt the shifted logical address by applying a map mapping the shifted logical address to the physical address, wherein the encryption module is configured to apply the map by conducting a multiplication and a modulo operation using the cryptographic key and a divisor of the modulo operation, such that the map is bijective, a data encryption-decryption unit for encrypting first plaintext data to obtain first ciphertext data and for decrypting second ciphertext data to obtain second plaintext data, a key storage for storing the cryptographic key, and a memory being configured to either store the first ciphertext data at the physical address, or to provide the second ciphertext data being stored at the physical address to the data encryption-decryption module.

11. A method for encrypting an input memory address to obtain an encrypted memory address, comprising:

receiving the input memory address being an address of a memory, segmenting the input memory address into a plurality of input memory address segments, and encrypting each input memory address segment of the plurality of input memory address segments depending on a respective one of a plurality of cryptographic subkeys to obtain the encrypted memory address, wherein encrypting said input memory address segment comprises applying a map mapping said input memory address segment to an encrypted memory address segment of a plurality of encrypted memory address segments by conducting a multiplication and a modulo operation using one of the plurality of cryptographic subkeys and one of a plurality of divisors, such that the map is bijective, wherein the encrypted memory address segments of the plurality of encrypted memory address segments together form the encrypted memory address.

12. The method of claim 11, wherein each of the plurality of input memory address segments indicates a polynomial of a first group of polynomials, wherein each of the plurality of encrypted memory address segments indicates a polynomial of a second group of polynomials, wherein each of the plurality of cryptographic subkeys indicates a third polynomial, and wherein each of the plurality of divisors indicates a fourth polynomial being an irreducible polynomial.

13. The method of claim 11, wherein conducting the multiplication and the modulo operation further uses one or more bits of the input memory address other than bits of the input memory address segment being mapped.

14. A non-transitory computer-readable medium comprising, stored thereupon, a computer program configured so that, when executed by a computer or signal processor, the computer program causes the computer or signal processor to encrypt an input memory address to obtain an encrypted memory address by:

receiving the input memory address being an address of a memory, segmenting the input memory address into a plurality of input memory address segments, and encrypting each input memory address segment of the plurality of input memory address segments depending on a respective one of a plurality of cryptographic subkeys to obtain the encrypted memory address, wherein encrypting said input memory address segment comprises applying a map mapping said input memory address segment to an encrypted memory address segment of a plurality of encrypted memory address segments by conducting a multiplication and a modulo operation using one of the plurality of cryptographic subkeys and one of a plurality of divisors, such that the map is bijective, wherein the encrypted memory address segments of the plurality of encrypted memory address segments together form the encrypted memory address.

* * * * *